US008282206B2

(12) United States Patent
Yanagi et al.

(10) Patent No.: US 8,282,206 B2
(45) Date of Patent: Oct. 9, 2012

(54) PRINTER

(75) Inventors: Haruyuki Yanagi, Machida (JP); Yasuhiko Ikeda, Sagamihara (JP); Hiroshi Ogushi, Shiroi (JP); Tetsuya Saito, Yokohama (JP); Takeji Niikura, Yokohama (JP); Masaaki Ishibashi, Hino (JP); Kenichi Nishimura, Tokyo (JP); Tetsuhiro Nitta, Yokohama (JP); Shigeyuki Sugiyama, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 12/555,907

(22) Filed: Sep. 9, 2009

(65) Prior Publication Data

US 2010/0066796 A1 Mar. 18, 2010

(30) Foreign Application Priority Data

Sep. 12, 2008 (JP) ................................. 2008-235007

(51) Int. Cl.

| | |
|---|---|
| ***B41J 29/13*** | (2006.01) |
| ***G06Q 40/00*** | (2012.01) |
| ***G07D 11/00*** | (2006.01) |
| ***G07F 19/00*** | (2006.01) |

(52) U.S. Cl. ........................................ 347/108; 235/379

(58) Field of Classification Search ......................... None
See application file for complete search history.

(56) References Cited

U.S. PATENT DOCUMENTS

| | | | | |
|---|---|---|---|---|
| 5,235,353 | A | 8/1993 | Hirano et al. | |
| 5,725,318 | A * | 3/1998 | Yamaguchi et al. | 400/120.02 |
| 7,270,264 | B2 * | 9/2007 | Douglass et al. | 235/379 |
| 7,735,722 | B1 * | 6/2010 | Lute et al. | 235/379 |
| 2005/0041054 | A1 | 2/2005 | Kawaguchi | |
| 2007/0077108 | A1 | 4/2007 | Kawasaki | |
| 2007/0097169 | A1 * | 5/2007 | Mizutani et al. | 347/23 |

FOREIGN PATENT DOCUMENTS

| | | | |
|---|---|---|---|
| JP | 2004-172842 | A | 6/2004 |
| JP | 2004-207926 | A | 7/2004 |

* cited by examiner

*Primary Examiner* — Stephen Meier
*Assistant Examiner* — Tracey McMillion
(74) *Attorney, Agent, or Firm* — Canon USA Inc IP Division

(57) ABSTRACT

A display unit includes a slide mechanism slidable in a lateral or vertical direction to a housing. A maintenance opening formed in the housing can be covered and uncovered. When the opening is uncovered, a user can access at least apart of a print section in the housing from the opening and perform maintenance.

10 Claims, 6 Drawing Sheets

PRINTER

BACKGROUND OF THE INVENTION

1. Field of the Invention

The present invention relates to a printer including a display.

2. Description of the Related Art

Photo printers having a function known as a direct print function, in which an image taken by a digital camera can be printed without using a personal computer (PC), are in a widespread use. In this function, a printer and a digital camera are connected directly, or a memory card used in the digital camera is mounted in a slot provided in the printer, and a captured image is read out and printed.

Many photo printers include a small-sized display such as a liquid crystal display device, to display the read-out image on the display, and print an image which a user has checked and specified. An example of a photo printer including such a display is discussed in Japanese Patent Application Laid-Open No. 2004-172842 and Japanese Patent Application Laid-Open No. 2004-207926.

In conventional photo printers, there is further room for improvement in visibility and operability of user interfaces. For example, to display and check a high-resolution image obtained by a recent advanced digital camera, it is desirable that the display includes in the printer should be large and as high-resolution as possible. On the other hand, the size of the printer body is required to be reduced. Therefore, a small display having a size of 3 to 4 inches at most due to the restriction of the apparatus layout are common place in the conventional printers.

SUMMARY OF THE INVENTION

The present invention is directed to a practically useful, good printer which has a display larger than that of conventional printers, while preventing the printer body from growing in size, by employing a novel apparatus layout.

According to an aspect of the present invention, a printer has a housing which includes an opening formed in at least one surface thereof, a print section which is arranged within the housing and forms an image on a medium, a display unit which is mounted on a surface on which the opening of the housing is formed and displays information about printing, wherein the display unit is slidable to the housing, the display unit can cover and uncover the opening, and a user can access at least a part of the print section in the housing through the opening when the opening is uncovered.

Further features and aspects of the present invention will become apparent from the following detailed description of exemplary embodiments with reference to the attached drawings.

BRIEF DESCRIPTION OF THE DRAWINGS

The accompanying drawings illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

A photo printer using an inkjet method will be described by way of example. In the inkjet method, various systems can be employed such as systems using a heating element, a piezoelectric element, an electrostatic element and a micro electro mechanical systems (MEMS).

The present invention is not limited to the inkjet method. For example, the present invention is applicable to a machine for either office or home use, such as a printer, a copier, a facsimile, and a multi-function peripheral using various methods such as an electrophotographic method, a thermal method, and a dot impact method, and is also applicable to various printers such as a commercial printing machine, and an industrial printing machine. In this specification, a sheet type print medium such as paper, and film is called a "medium".

Figure 1:
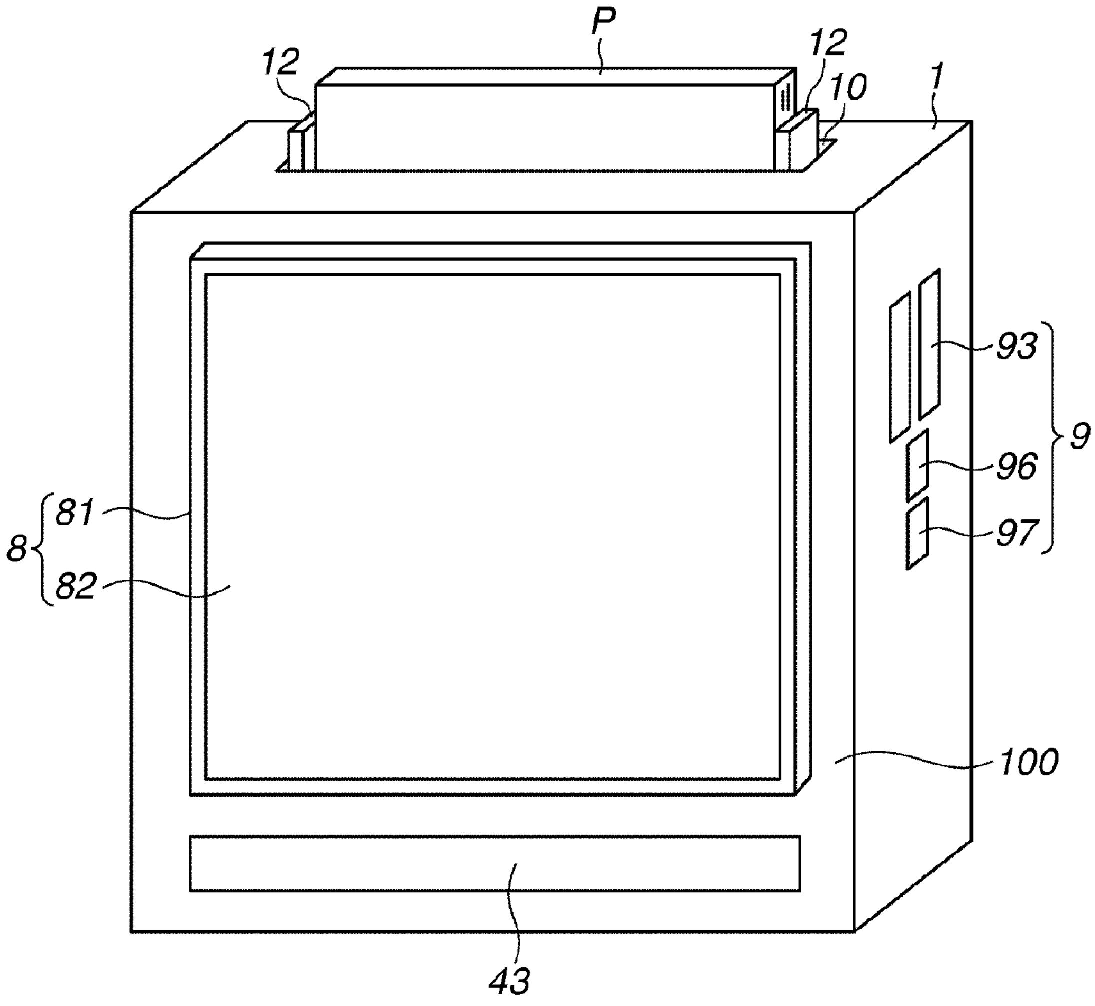
FIG. 1 is an external perspective view of a printer according to an exemplary embodiment of the present invention.
Figure 2:
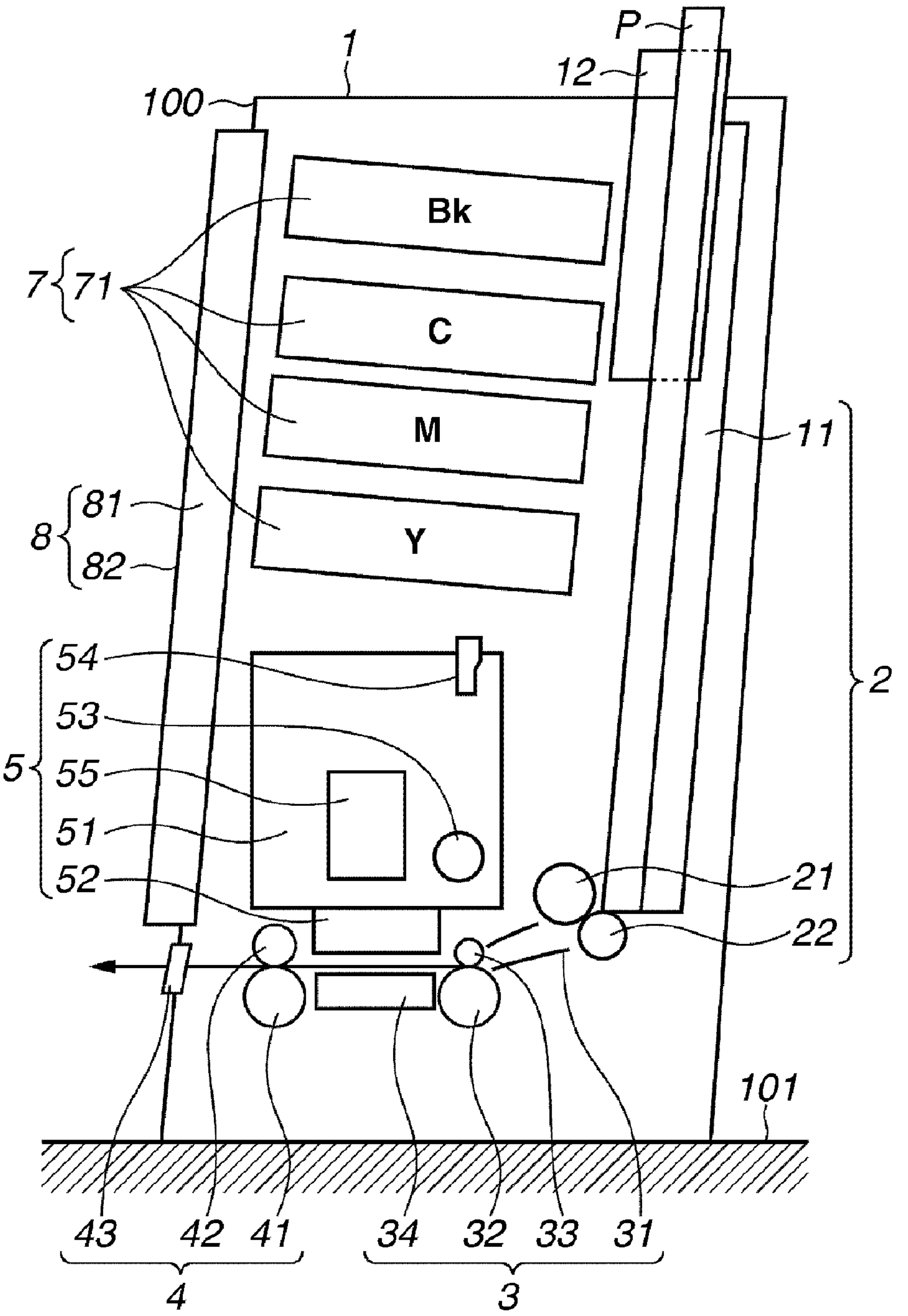
FIG. 2 is a cross-sectional view of the printer of FIG. 1.
Figure 3:
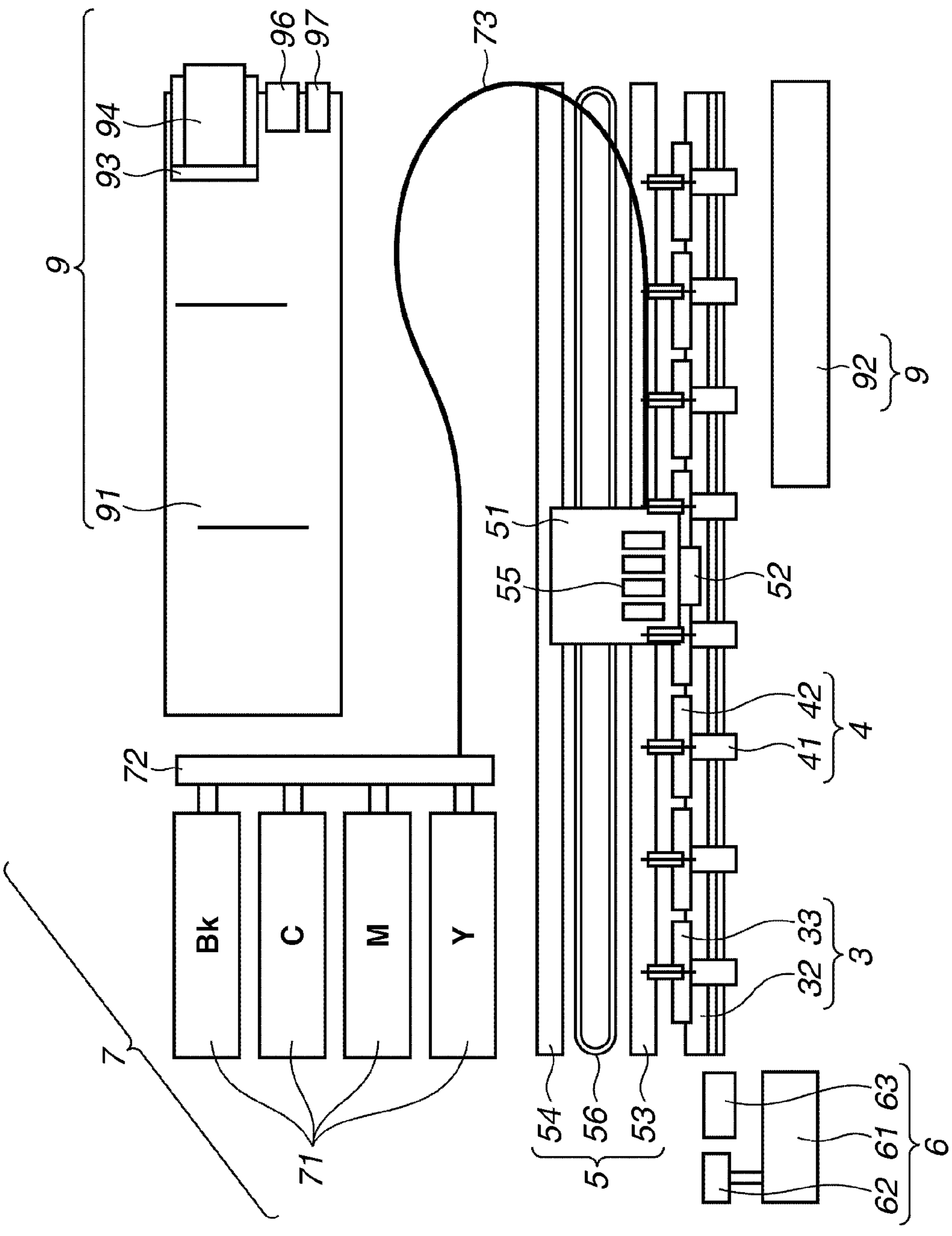
FIG. 3 is an internal configuration diagram of the printer of FIG. 1.

FIG. 1 is an external perspective view of the photo printer including a display according to an exemplary embodiment of the present invention. FIG. 2 is a cross-sectional view seen from the side, and FIG. 3 is an internal configuration of the printer.

The printer includes a housing 1, a medium feeding unit 2, a conveyance unit 3, a discharging unit 4, a carriage unit 5, a cleaning unit 6, an ink tank unit 7, a sliding cover 8 with a display panel 82, and an electrical unit 9. The medium feeding unit 2, the conveyance unit 3, the discharging unit 4, the carriage unit 5, the cleaning unit 6, and the ink tank unit 7 are collectively referred to as the print section.

The housing 1, which is an outer frame of the printer, is a box having a vertically long shape when installed on a setting floor 101, and as described later, an opening formed in at least one surface thereof. As illustrated in FIG. 2, the overall shape is basically a cuboid, which is tilted a little in the front-back direction. The housing 1 is designed to tilt a front surface 100 upward a little to improve visibility and operability of the sliding cover 8 from the front, and also improve accessibility from the front during maintenance work. The "vertically long shape" here means a shape in which an area of the bottom surface of the housing at the time of setting is smaller than an area of the front surface of the housing. The "front surface" is a front face facing a user when the printer is used.

The medium feeding unit 2 is a collective name for a mechanism for feeding a medium to be printed to the print section, and includes a feed inlet 10, a pressing plate 11, a side guide 12, a feed roller 21, and a separation roller 22.

In the upper surface of the housing 1, the feed inlet 10, into which a user collectively inserts a plurality of media P, is formed. The media P inserted here are supported, in a state in which a plurality of the media are stacked, by the pressing plate 11 having a support surface tilted a little to the vertical direction. The media P are controlled in a width direction by the movable side guide 12. Although a part of the media P protrudes from the housing 1 when the media P are of a large size, there is no problem in use. The housing 1 has a vertically long shape when installed, and a plurality of media P is stored in the housing 1 in the vertical direction approximately parallel to (parallel to or nearly parallel to) the sliding cover 8.

When feeding the media P supported by the pressing plate 11, first, the leading edge of the medium P is inserted between the feed roller 21 and the separation roller 22, and the medium P is conveyed by rotation of the feed roller 21. When a plurality of media is inserted between the two rollers in an overlapped state, the separation roller 22 controls the media other than the upper most medium, and only the uppermost medium is separated and conveyed.

The conveyance unit 3 is a collective name for a mechanism for conveying a medium when performing printing, and includes a guide 31, a conveyance roller 32, a pinch roller 33, and a platen 34. The discharging unit 4 is a mechanism for discharging from the housing 1 a medium which has been printed, and includes a discharging roller 41, a spur roller 42, and an discharging opening 43.

The medium P fed from the medium feeding unit 2 is guided by the guide 31. The medium P is sandwiched by a pair of rollers constituted by the conveyance roller 32 and the pinch roller 33, and conveyed in the sub-scanning direction with a constant speed to obtain a print having no irregular image, by driving the conveyance roller 32. The platen 34 is a guide for maintaining an appropriate distance between the medium P which is being printed and a recording head.

The medium P which is being printed or has been printed is conveyed by a pair of rollers constituted by the discharging roller 41 and the spur roller 42, and discharged from the discharging opening 43 to the outside of the housing 1. The discharging opening 43 is formed below the sliding cover 8 on the front surface 100 of the housing 1.

The carriage unit 5 is a collective name of a mechanism for performing printing on the medium to form an image by using inkjet method. The carriage unit 5 includes a carriage 51, a recording head 52, a guide shaft 53, a guide rail 54, and a belt 56.

The carriage 51 holds the recording head 52 including discharge nozzles corresponding to four colors. The carriage 51 directs an ink discharge surface of the recording head 52 to face the medium P on the platen 34, and reciprocates in the main scanning direction perpendicular to the medium conveyance direction (sub-scanning direction). The carriage 51 is supported movably in the main scanning direction by the guide shaft 53 and the guide rail 54 which holds and guides the upper edge of the carriage 51. The carriage 51 is moved by a driving force transferred from a motor not illustrated in the figures via the belt 56. The recording head 52 discharges inks corresponding to a movement to form an image on the medium P.

The cleaning unit 6 is a mechanism for cleaning the discharge surface around the discharge nozzles of the recording head 52, and includes a pump 61, a cap 62, and blade 63. The cleaning unit 6 performs cleaning using the pump 61 and the blade 63 at predetermined timing in an operation sequence of the printer. When not in use, the discharge nozzles of the recording head 52 are covered by the cap 62 to prevent the recording head 52 from drying.

The ink tank unit 7 is a collective name for ink tanks 71 that contain ink to be supplied to the recording head 52. The ink tank unit 7 includes independent main-ink tanks 71 for four colors Y, M, C, and Bk, and sub-tanks 55 which are four independent sub-ink tanks mounted on the carriage unit 5. The ink tanks 71 and the sub-tanks 55 are held by a mechanism including a holder, and are respectively attachable and detachable for exchange. Ink of each color is supplied to the four sub-tanks 55 from the ink tanks 71 of four colors via a joint 72 and flexible tubes 73 (four tubes are bundled). Ink of each color is supplied from the sub-tanks 55 to the recording head 52.

Otherwise, ink tanks may not be separated into the ink tanks 71 and sub-tanks 55, but capacity of the sub-tanks 55 is increased and the main-ink tanks 71 may be eliminated.

The sliding cover 8 is a user interface unit which displays various information about printing to a user, and from which the user inputs information. The various information about printing includes a display of an image before printing (thumbnail display, or enlarged display of a page), a display for operating the printer (display of type and size of medium, the number of pages to be printed, and the like), a display for maintenance (display of operation procedure for maintenance when exchanging an ink tank or removing a jam handling), and the like.

Figure 4:
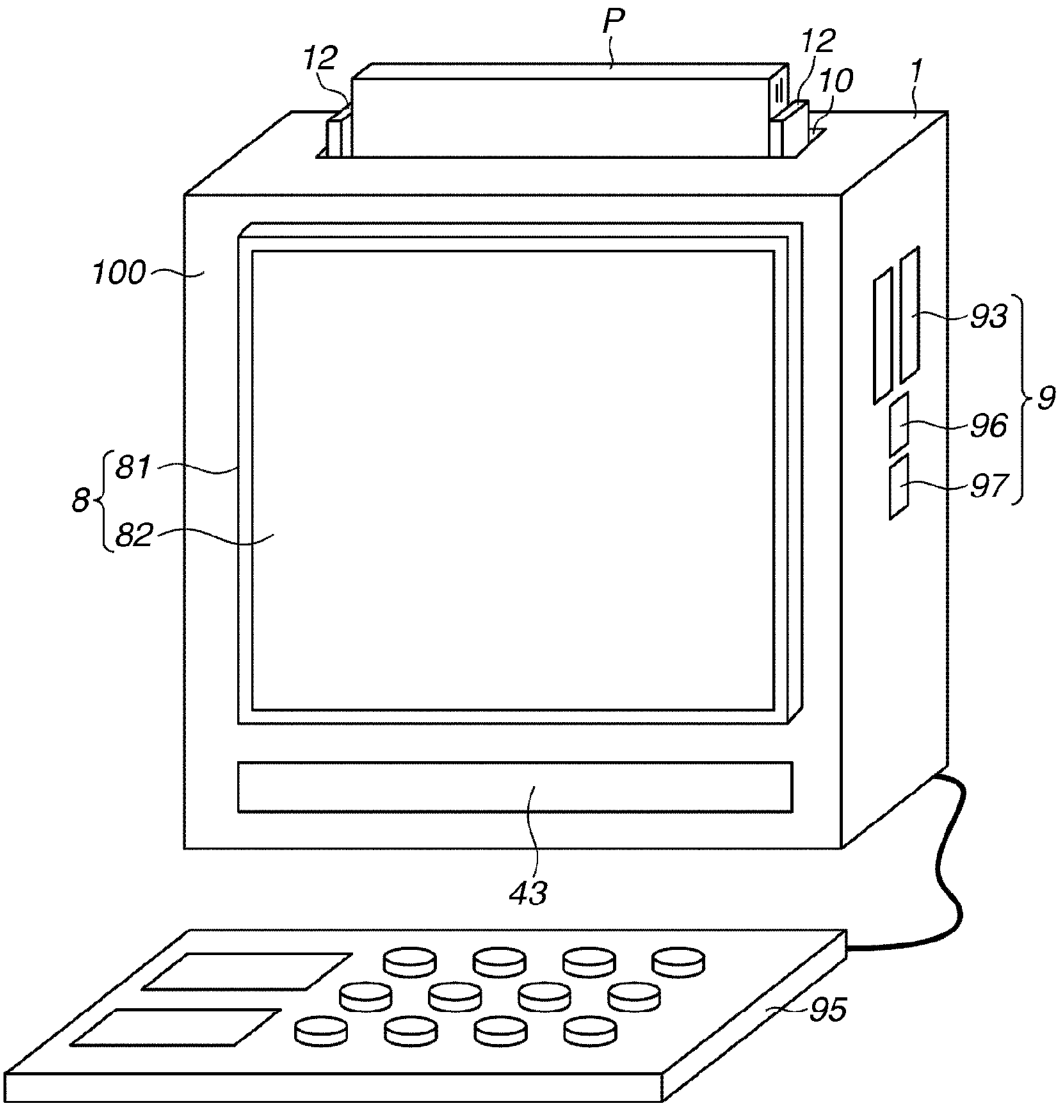
FIG. 4 is an external perspective view of a printer of another form of FIG. 1.

The sliding cover 8 includes a display panel 82 and a frame body 81 which holds and reinforces the display panel 82, and as described below, is slidably attached to the front surface 100 of the housing 1. The display panel 82 is a large-sized and of high-resolution (5 to 20 inches diagonal, for example, 15-inch extended graphics array (XGA)) liquid crystal or organic electro-luminescence (EL) type flat panel display. An input unit constituted by a transparent touch panel using an electrostatic method, a piezoelectric method, or the like is integrally overlapped on the display panel 82, so that a user can input information by touch panel operation while looking at the display screen. As illustrated in FIG. 4, instead of the touch panel, an input device 95 of a separate body may be used as an input unit.

The sliding cover 8 arranged on the front surface of the housing 1 is approximately parallel to the pressing plate 11 and the media P in the housing 1. The carriage unit 5 and the ink tank unit 7 are arranged in a space parallel to and between the pressing plate 11 and the media P and the sliding cover 8 in the housing 1, so that the integration degree of the apparatus is increased.

The electrical unit 9, as illustrated in FIG. 3, is an electric processing system for controlling and processing the entire printer, and includes a main substrate 91 and a power supply substrate 92. In addition, the electrical unit 9 includes a memory slot 93 for inserting and mounting a memory card 94 which provides an image to be printed, and connectors 96 and 97, which are interfaces such as universal serial bus (USB), IEEE1394, and the like, for connecting to external information equipment such as a PC, a digital camera, and the like. These are arranged, as illustrated in FIG. 1, on a surface of the housing 1 other than the front surface 100 on which the sliding cover 8 is mounted, and arranged not to interfere with the sliding cover 8 when the sliding cover 8 is slid as described below.

In the printer of the above configuration, the sliding cover 8 can be slidingly moved in the lateral or vertical direction parallel to the front surface 100 of the housing 1. By this sliding movement, it is possible to cover and uncover a maintenance opening formed in the housing 1. When the opening is uncovered, a user can access the print section in the housing and perform maintenance operations.

This operation will be described with reference to FIGS. 5 and 6. Both figures are front views when the sliding cover 8 is slid to uncover the opening, and the opening formed in the housing is exposed.

Figure 5:
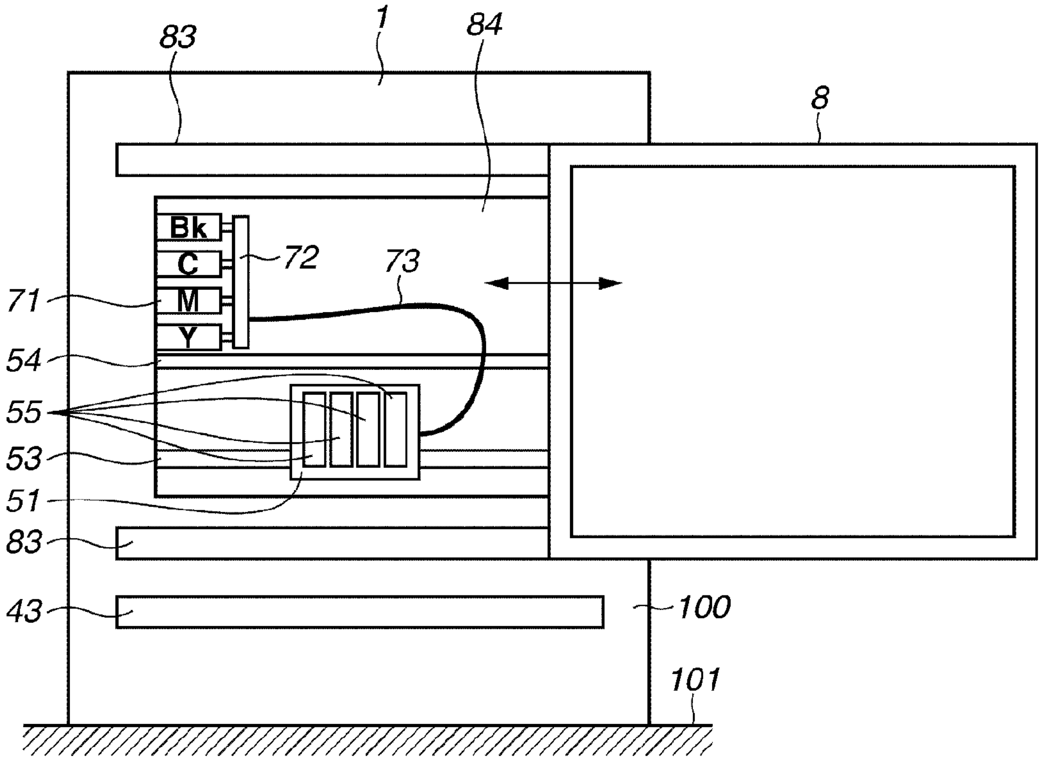
FIG. 5 is a front view when a sliding cover is slid in a lateral direction.

In FIG. 5, the opening 84 for maintenance is formed in the front surface of the housing 1, and a part of the print section in the housing 1 is exposed from the opening 84. A slide mechanism including two slide rails 83 arranged in the lateral direction and provided in the front surface 100 of the housing 1. By this slide mechanism, the sliding cover 8 can be slidably moved in the lateral direction indicated by the arrow (the direction parallel to the front surface 100 of the housing, and also parallel to the surface of the setting floor 101).

Figure 6:
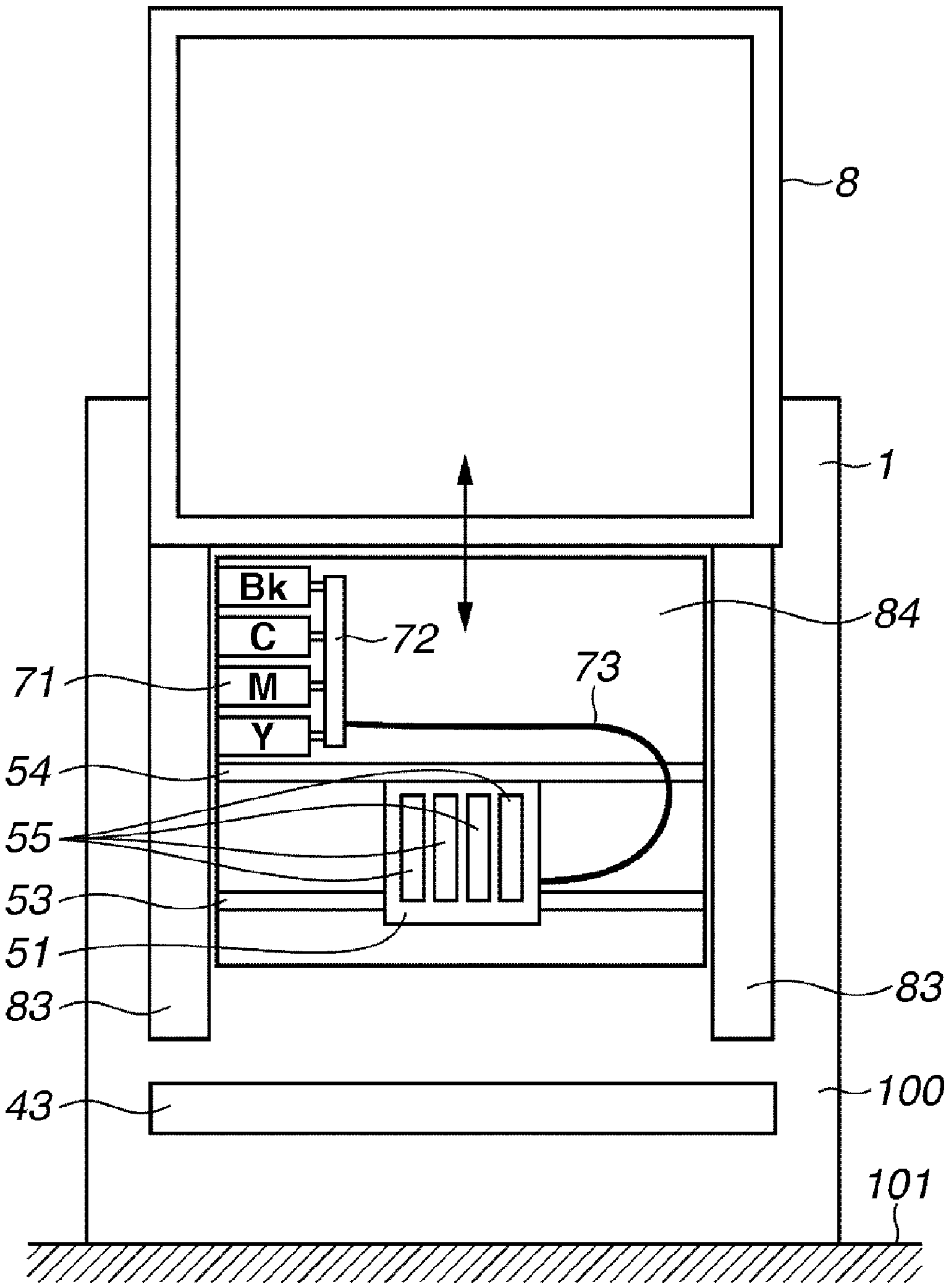
FIG. 6 is a front view when a sliding cover is slid in a vertical direction.

FIG. 6 illustrates the second exemplary embodiment. A slide mechanism including two slide rails 83 arranged in the vertical direction and provided in the front surface 100 of the housing 1. The sliding cover 8 can be slidably moved in the up-down vertical direction indicated by the arrow (the direction parallel to the front surface 100 of the housing 1, and crossing the surface of the setting floor 101).

In a third embodiment as described below, the sliding cover 8 is supported on the front surface 100 with a pivotal support provided between the front surface 100 and the sliding cover 8 at one corner. The sliding cover 8 can be rotatably slid with the pivotal support in a rotational direction which is parallel to the front surface 100 instead of sliding straightforward.

In the configuration of FIG. 5, FIG. 6 or the third embodiment, when the sliding cover 8 is opened, the opening 84 formed in the front surface of the housing 1 is exposed. A user can access at least a part of the print section in the housing 1 from the opening 84 and perform various maintenance operations. As described above, the print section is a collective name of the medium feeding unit 2, the conveyance unit 3, the discharging unit 4, the carriage unit 5, the cleaning unit 6, and the ink tank unit 7.

The maintenance operations are, for example, as follows.

(1) Operation for Recovering from a Jam

Jam handling is an operation in which a user removes a jammed medium P when a jam of the medium P occurs and the medium is stuck during printing. When a jam is detected, the apparatus displays the jam position (the medium feeding unit 2, the conveyance unit 3, or the discharging unit 4) where the jam occurs, and the recovery procedures in the display panel 82 to help the user.

(2) Operation for Exchanging Ink Tanks

In an exchange operation a user exchanges an empty color ink tank 71 or sub-tank 55. When the sliding cover 8 is slid and the opening is uncovered, the carriage 51 is automatically moved to near the center of the opening 84 to facilitate the exchange operation. At this time, ink tanks which should be exchanged and the operation procedure are displayed on the display panel 82 to help the user.

(3) Other Maintenances

Other maintenance operations are inspection and exchange of the recording head 52 of the carriage unit 5, inspection and exchange of the joint 72 and the tubes 73, and inspection and exchange of the cleaning unit 6. When the sliding cover 8 is slid and the opening is uncovered, the carriage 51 is automatically moved to near the center of the opening 84 to facilitate the maintenance operation.

As described above, the printer of the present embodiment realizes a compact layout by arranging the carriage unit 5 and the ink tank unit 7 in a space parallel to and between the sliding cover 8 and the accommodated media P, as the housing 1 having a vertically long shape when set on the setting floor 101. In addition, the sliding cover 8 slides so that the maintenance opening 84 is uncovered. In this way, despite a compact size with small footprint, the printer can include a large screen display, while having high maintenance operability. In short, the printer realizes a good balance between downsizing and excellent operability at a high level.

The following advantages are provided, especially, when the sliding cover 8 slides in the lateral direction, the vertical direction or the rotational direction, each being parallel to the front surface 100 of the housing 1. One advantage is that the direction in which the user accesses the opening 84 when performing maintenance approximately corresponds to the direction in which the user looks at the display which shows information to help the user to perform the maintenance task. Therefore, the user can check the maintenance information on the display and at the same time perform the maintenance task from the same direction, so that usability is very high. Another advantage is that the user looks at the display from the same direction when performing printing and performing maintenance; therefore, the usability is unified, so that the user is not confused.

While the present invention has been described with reference to exemplary embodiments, it is to be understood that the invention is not limited to the disclosed exemplary embodiments.

This application claims priority from Japanese Patent Application No. 2008-235007 filed Sep. 12, 2008, which is hereby incorporated by reference herein in its entirety.

What is claimed is:

1. A printer, comprising:

a housing having an opening formed in at least one surface of the housing;

a print section arranged within the housing configured to print on a medium; and a sliding cover with a display mounted on the sliding cover, the sliding cover being mounted on the surface in which the opening of the housing is formed, and the display being larger than the opening, wherein the sliding cover is slidable with respect to the housing between a first position in which the opening is covered and a second position in which the opening is uncovered, the opening and sliding cover being arranged such that a user can access at least a part of the print section within the housing through the opening for maintenance when the opening is uncovered.

2. The printer according to claim 1, wherein information related to maintenance of the print section can be displayed on the display when the opening is uncovered.

3. The printer according to claim 1, wherein the second position is located to a side of or above the opening, and the sliding cover is arranged to move parallel to the surface of the housing in which the opening is formed between the first and second positions.

4. The printer according to claim 1, wherein the housing has a bottom surface and a front surface which has a larger area than the bottom surface, the sliding cover is mounted on the front surface of the housing, and the housing is arranged to store a plurality of media substantially within the housing approximately parallel to the sliding cover.

5. The printer according to claim 1, wherein the print section comprises:

a mechanism arranged to convey the medium;

a print mechanism with a recording head; and a mechanism arranged to hold one or more ink tanks for containing ink, the opening being arranged such that when the sliding cover is moved to expose the opening a user can perform at least one of an exchange of the one or more ink tanks and a jam handling of the medium through the opening.

6. The printer according to claim 5, wherein the print mechanism comprises a carriage unit for holding the recording head.

7. A printer comprising:

a housing having an opening formed in at least one surface of the housing;

a print section arranged within the housing configured to print on a medium;

a sliding cover with a display mounted on the sliding cover, the sliding cover being mounted on the surface in which the opening of the housing is formed; and a slot arranged to receive a memory card for providing an image to be printed, the slot being arranged on a surface of the housing distinct from the surface on which the sliding cover is mounted, wherein the sliding cover is slidable with respect to the housing between a first position in which the opening is covered and a second position in which the opening is uncovered, the opening and sliding cover being arranged such that a user can access at least a part of the print section within the housing through the opening for maintenance when the opening is uncovered.

8. The printer according to claim 7, wherein the display is larger than the opening.

9. The printer according to claim 7, wherein information related to maintenance of the print section can be displayed on the display when the opening is uncovered.

10. The printer according to claim 7, wherein the second position is located to a side of or above the opening, and the sliding cover is arranged to move parallel to the surface of the housing in which the opening is formed between the first and second positions.

* * * * *